No. 695,350. Patented Mar. 11, 1902.
A. THEUERKAUF.
PIPE BENDING MACHINE.
(Application filed June 10, 1901.)
(No Model.) 4 Sheets—Sheet 1.

Witnesses.
Inventor.
Albert Theuerkauf.
by G. Gittman
Atty.

No. 695,350. Patented Mar. 11, 1902.
A. THEUERKAUF.
PIPE BENDING MACHINE.
(Application filed June 10, 1901.)
(No Model.) 4 Sheets—Sheet 2.

Witnesses.
J. H. Richardson
M. C. Lyddane

Inventor.
Albert Theuerkauf.
by G. Gittman
Atty.

No. 695,350. Patented Mar. 11, 1902.
A. THEUERKAUF.
PIPE BENDING MACHINE.
(Application filed June 10, 1901.)
(No Model.) 4 Sheets—Sheet 3.

Witnesses. Inventor:

No. 695,350. Patented Mar. 11, 1902.
A. THEUERKAUF.
PIPE BENDING MACHINE.
(Application filed June 10, 1901.)
(No Model.) 4 Sheets—Sheet 4.
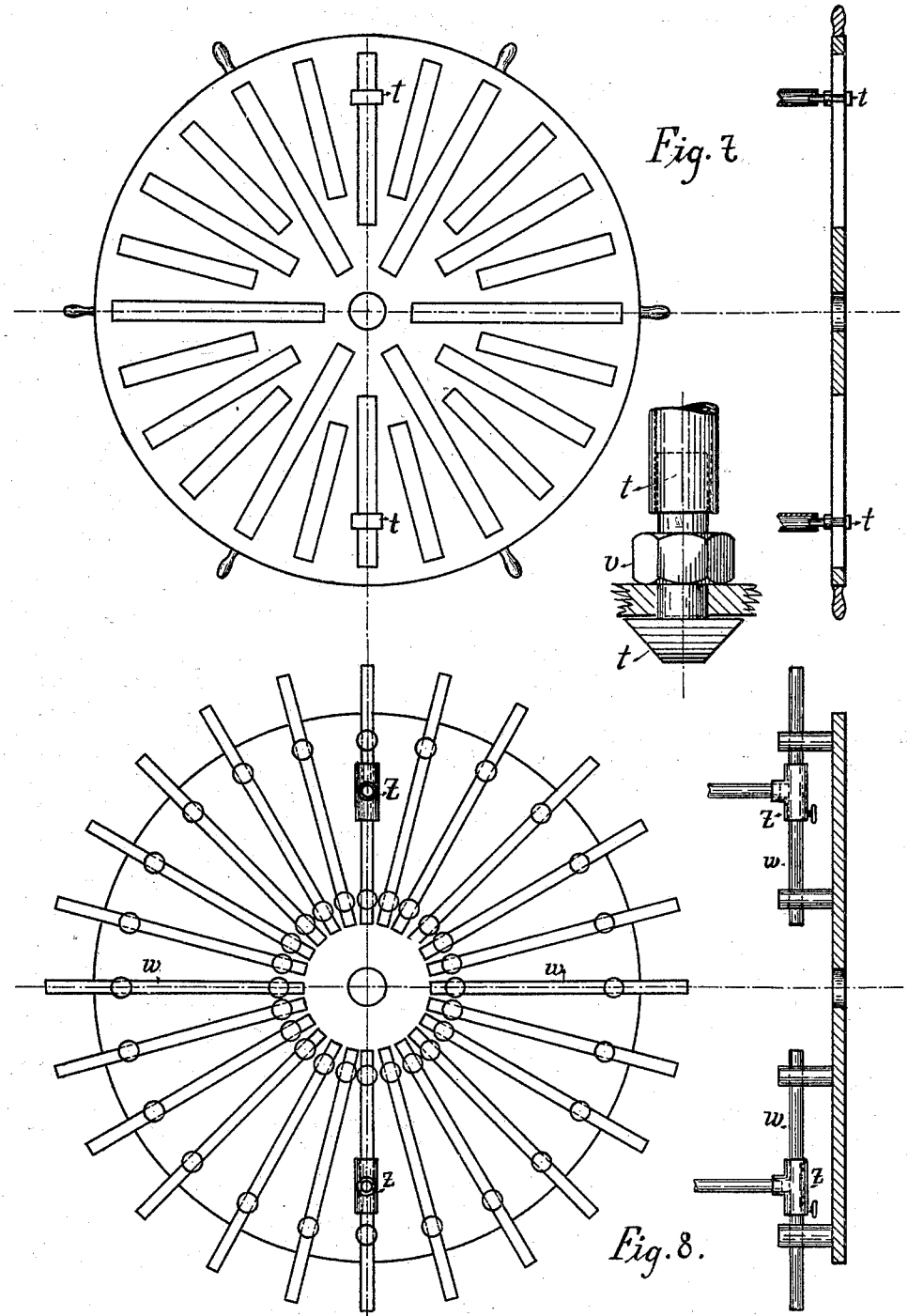

UNITED STATES PATENT OFFICE.

ALBERT THEUERKAUF, OF DUSSELDORF, GERMANY.

PIPE-BENDING MACHINE.

SPECIFICATION forming part of Letters Patent No. 695,350, dated March 11, 1902.

Application filed June 10, 1901. Serial No. 64,020. (No model.)

*To all whom it may concern:*

Be it known that I, ALBERT THEUERKAUF, a citizen of Germany, residing at Dusseldorf, Germany, have invented certain new and useful Improvements in Pipe-Bending Machines; and I do hereby declare the following to be a full, clear, and exact description of the invention, such as will enable others skilled in the art to which it appertains to make and use the same.

It is well known in the art that seamless metal pipes will stand much greater strains than welded or otherwise joined pipe and may be bent into many forms into which it would be impossible to bend the welded pipes.

The present invention has for its object the provision of a machine for bending seamless metal pipe in many forms, the said machine being simple in construction and easily operated.

With this object in view the invention consists in the machine for bending seamless pipe, the construction, arrangement, and combination of the parts of which will be first fully described herein, and afterward specifically pointed out in the claims.

Figure 1:
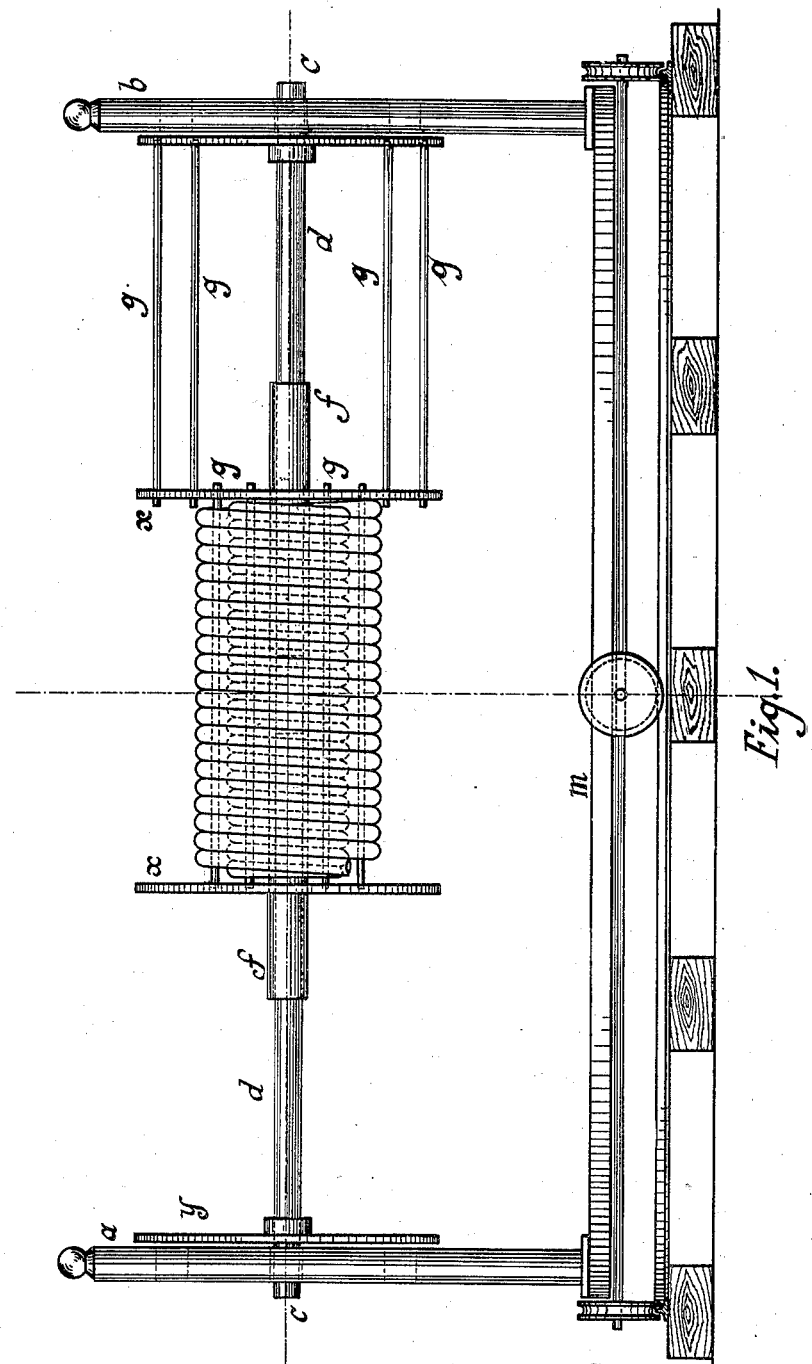
Figure 2:
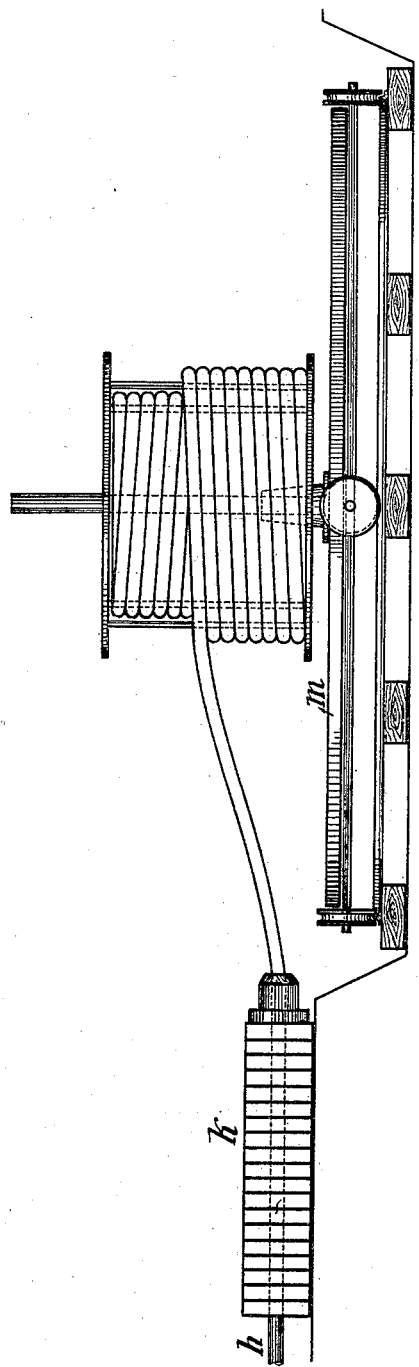

In the accompanying drawings, Figure 1 is a view in side elevation of a machine constructed according to this invention arranged to bend seamless pipe on horizontal forms. Fig. 2 is a view in side elevation of a machine constructed according to this invention arranged to bend seamless pipe upon vertical forms. Figs. 3, 4, 5, 6, 7, 8, 9, 10, and 11 are detail views of parts of forms upon which to bend seamless pipe in a machine such as herein described, which details will be specifically referred to hereinafter.

Referring especially to Fig. 1, $m$ indicates a rotatable plate or disk upon which are mounted two vertical posts $a$ and $b$, preferably diametrically opposite each other in the same vertical plane, the said posts being provided with bearings at different heights for the reception of a shaft $c$, which is composite, consisting of two pipes $d$, fitted in the opposite ends of another pipe $f$ of greater diameter, whereby the pipes $d$ may be longitudinally moved or adjusted in said pipe $f$, the pipes $d$ and $f$ being perforated to receive securing-pins to prevent their accidental longitudinal displacement with relation to each other.

Upon the shaft $c$ may be secured a number of form-disks which are perforated, all the disks of any particular form having their perforations in exactly the same positions with relation to each other, whereby straight pipes $g$ may be positioned in the perforations of two adjacent disks to compose a form around which to bend seamless and endless pipes $h$.

As before stated, it will be observed that the form of Fig. 1 is horizontal, while that of Fig. 2 is vertical, no means being shown for turning them in either figure, inasmuch as any suitable power may be used for the purpose.

In order to bend an endless pipe into a number of coils, the machine is operated as follows: The middle disks $x\ x$ and the outer disks $y\ y$, as shown in Fig. 1, are rigidly secured upon the shaft $c$, and those of the pipes $g$, which are to compose the smallest supporting-form, are placed in position in the proper perforations of the disks $x\ x$, while those of the pipes or bars $g$, which are intended for the outer forms or supports, are placed temporarily in corresponding perforations in either or both sets of disks $x$ and $y$. The pipe $h$, which, as before stated, is endless and seamless, is passed through a suitable heating-furnace (not shown) and bent about the smallest form, consisting of bars or pipes $g$, in positions in perforations of disks $x\ x$, as before described. As soon as this form has been filled with the bent pipe $h$ the pipes or bars $g$, temporarily in position in disks $x\ y$, are moved longitudinally to their active positions for the second form into the perforations of the disks $x\ x$. The continuation of the rotation of the form will now bend the heated endless pipe $h$ around the second form, so that when the pipe is allowed to cool and the disks and pipe $c$ are dismounted, so as to remove the bent pipes from the forms, the pipe $h$ will be found to be bent in two coils, one inclosing the other. By increasing the number of forms the number of coils into which the endless pipes may be bent may be correspondingly increased.

Figure 3:
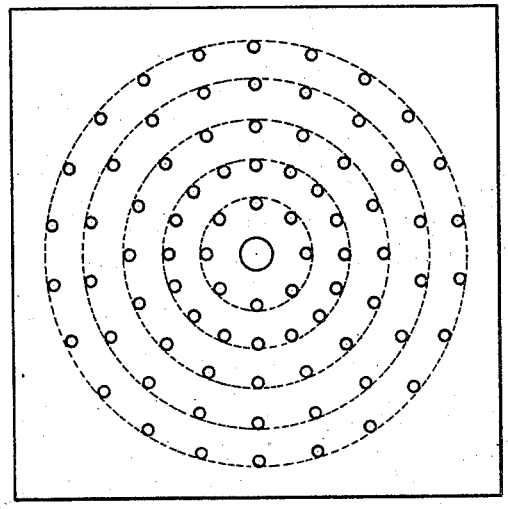
Figure 4:
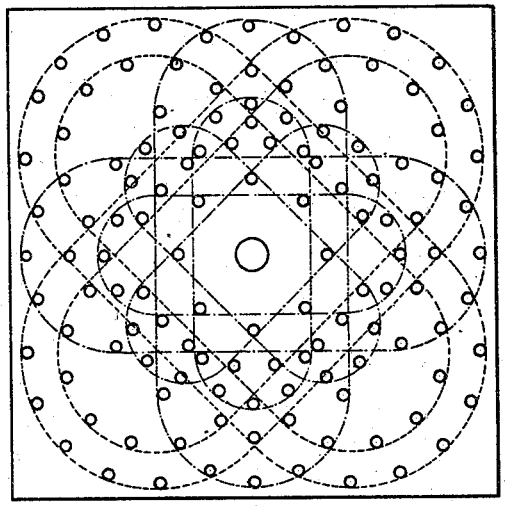
Figure 5:
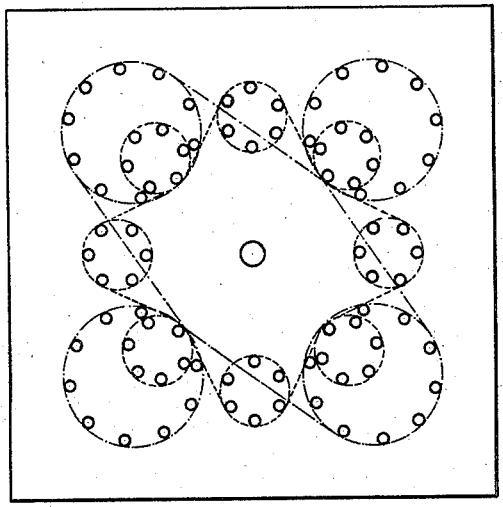
Figure 6:
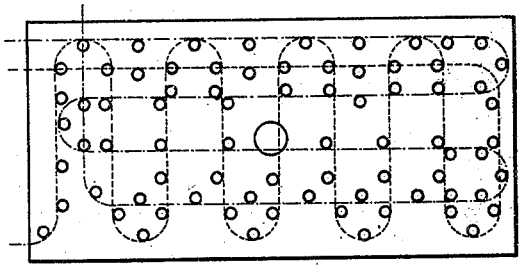

The contour of the forms, and consequently of the bent coils of pipes, may be varied to a large extent by changing the location of the perforations of the disks, as illustrated in detail in Figs. 3 to 6. Fig. 3 shows a disk with the perforations arranged in circles and represents substantially the disks of Figs. 1 and 2. Fig. 4 shows a disk with an arangement of perforations for forming coils of differing forms and dimensions. Fig. 5 shows a disk with perforations arranged for forms comprising eight small circles relatively larger and smaller in diameter. Fig. 6 shows a disk with perforations arranged for forms about which to bend flat coils or worms of pipe.

In Fig. 7 is shown a disk with radial slots in which the ends of the supporting bars or pipes $g$ are secured in any desired manner—for instance, by bolts $t$ passing through the disks into the ends of the pipes $g$ and provided with jam-nuts, as particularly shown in Figs. 8 and 9, which are sectional views of parts.

In Figs. 10 and 11 I show how I may use radially-secured bars $w$, supported in arms projecting laterally upon inner faces of the disks, slidable clamping-sleeves $z$ being adjustably secured on the rods and arranged to receive the ends of the pipes or bars $g$ of the various forms.

Having thus fully described my invention, what I claim as new, and desire to secure by Letters Patent of the United States, is—

1. In a metal-pipe-bending machine the combination with a shaft, of three disks fixed thereon, each disk being provided with perforations registering with those of the other two, and bars or pipes arranged in the perforations of two of the disks in position to compose a form for coiling, whereby the bars or pipes may be slid into or from said positions sliding through the middle disk when so placed in or removed from such positions, substantially as described.

2. In a metal-pipe-bending machine, the combination with a shaft, of three disks fixed thereon, each disk being provided with perforations similarly arranged, bars or pipes in position in the perforations of two disks to compose a small inner form for coiling, and bars or pipes arranged in the perforations of two of the disks in position to compose an outer form for coiling whereby the endless pipe may be first coiled about the inner form and the bars of the outer form be slid into position in the perforations of the same disks as the first form in position to receive the endless pipe upon the further rotation of the forms, substantially as described.

3. In a metal-pipe-bending machine the combination of a shaft, disks supported thereon and provided with registering series of perforations, arranged to form a plurality of outlines of different shapes, and bars or pipes removably and slidably supported in said perforations whereby they may be slid into position to compose forms of various outlines about which to bend or coil endless pipe, into corresponding shapes, substantially as described.

In testimony whereof I affix my signature in presence of two witnesses.

ALBERT THEUERKAUF.

Witnesses:
WILLIAM ESSENWEIN,
OSKAR KÜNZELL.

No. 695,351. Patented Mar. 11, 1902.
O. THOMPSON.
WIRE FENCE REEL.
(Application filed Jan. 28, 1901.)
(No Model.)
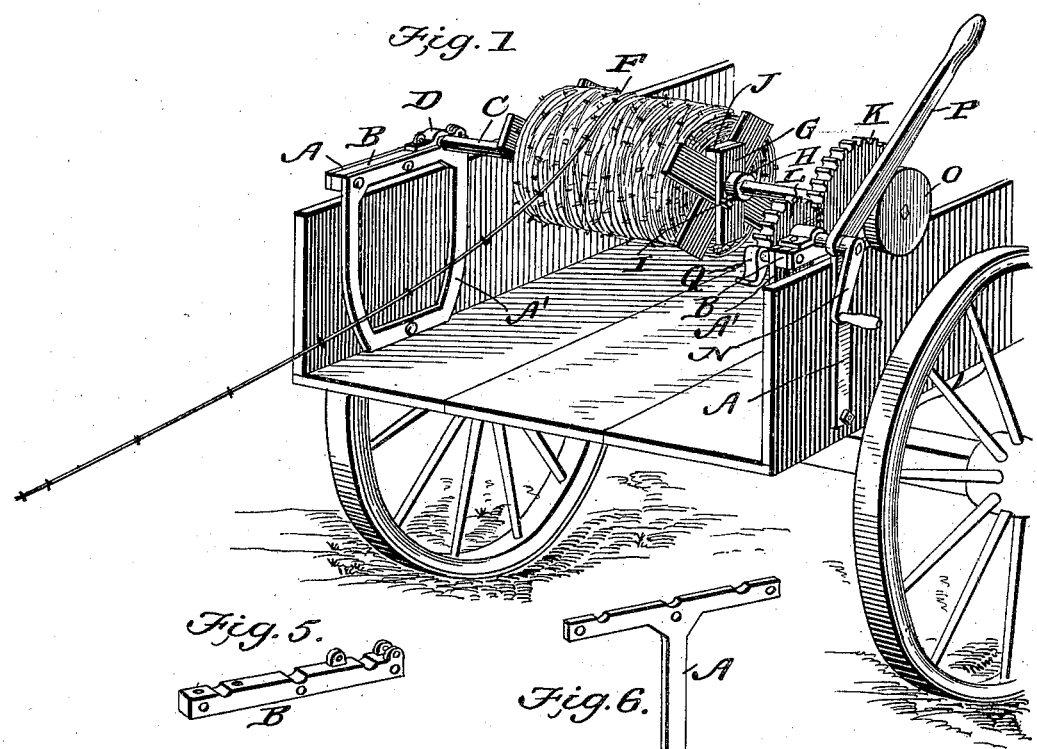
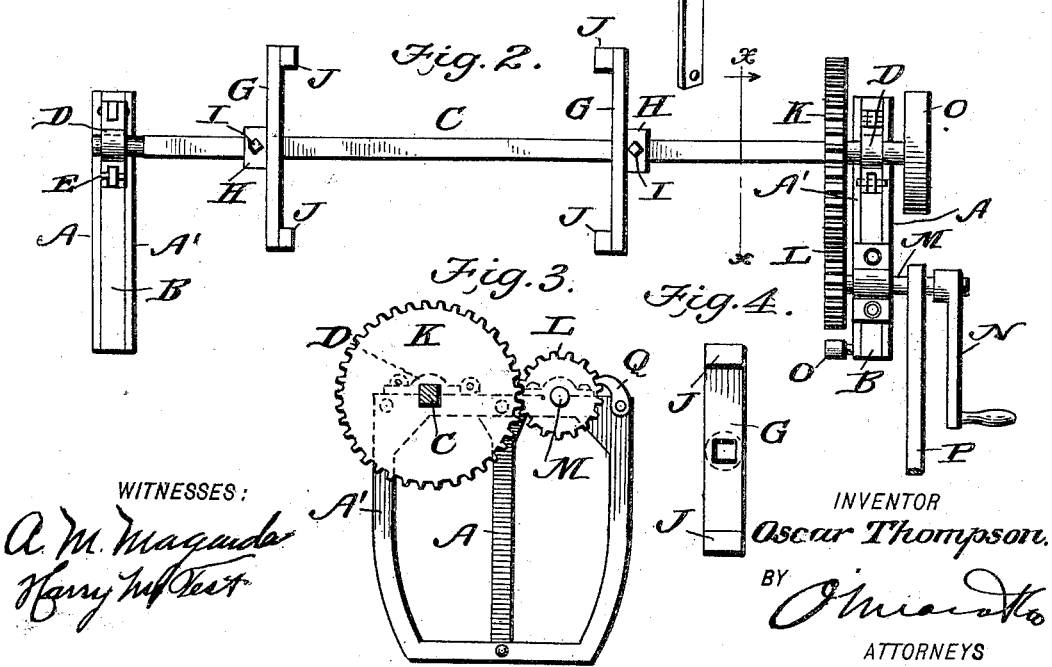
WITNESSES:
INVENTOR
Oscar Thompson.
BY
ATTORNEYS